UNITED STATES PATENT OFFICE.

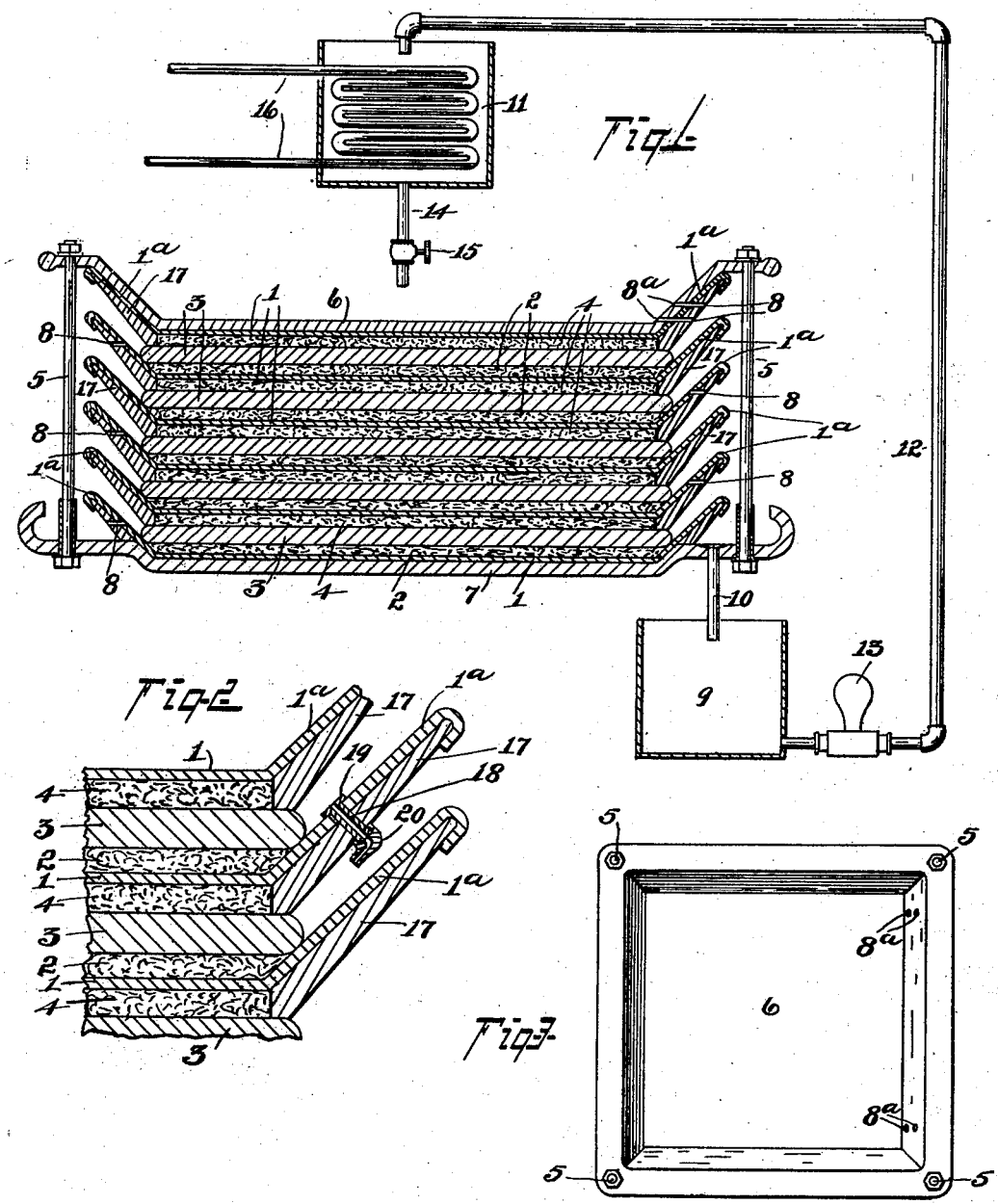

ARTHUR D. EDGERTON, OF PHILADELPHIA, PENNSYLVANIA, ASSIGNOR OF ONE-HALF TO HARRY C. CAMPION AND JOHN W. JENNINGS, OF PHILADELPHIA, PENNSYLVANIA.

STORAGE BATTERY.

SPECIFICATION forming part of Letters Patent No. 702,361, dated June 10, 1902.

Application filed November 13, 1900. Serial No. 36,342. (No model.)

*To all whom it may concern:*

Be it known that I, ARTHUR D. EDGERTON, a citizen of the United States, residing in the city and county of Philadelphia, in the State of Pennsylvania, have invented certain new and useful Improvements in Storage Batteries, of which the following is a full, clear, and exact description, reference being had to the accompanying drawings, of which—

Figure 1 is a sectional side elevation. Fig. 2 is a portion of Fig. 1 enlarged. Fig. 3 is a reduced plan view of the battery.

The object of this invention is to increase by simple and comparatively inexpensive means the efficiency of storage batteries.

The leading feature of the invention consists in a construction whereby the electrolyte, usually dilute sulfuric acid, is caused to circulate in the battery in such manner that it (the electrolyte) will be maintained at a practically uniform specific gravity throughout the several cells of the battery, thereby maintaining uniform efficiency of said cells.

Other features of the invention relate to means for conveniently effecting the recirculation of the electrolyte after it has passed through the battery; also, to means for cooling or heating the electrolyte, as may be required, before recirculating; also, to certain details of construction, all as hereinafter described and duly pointed out.

I have shown in the drawings accompanying and forming a part of this specification my invention as applied to a known form of storage battery in which a series of pan-like cells are mounted one above the other and the whole suitably connected together. This form of battery is as follows, reference being had to the said drawings.

1 is a series of thin lead plates of pan-like shape—that is, with raised sides, as shown. These plates are separated by the usual energizing substances—such as, in the present instance, a layer 2 of red lead contiguous to the upper surface of the bottom of the plates 1, respectively, (excepting the uppermost plate;) then a layer 3 of absorbent acid-resisting nonconducting material or such material of low conductivity—as, for example, charcoal; then a layer 4 of litharge, whose upper surface is contiguous to the under side of the bottom of the overlying plate or pan. The layer 3 may be either an integral plate, provided it be absorbent, acid-resisting, and practically non-conducting, or a mass of comminuted charcoal of low conductivity or the like, its only function being to separate the litharge and red lead by a layer of electrolyte, such as sulfuric acid. There may be as many of these plates with intervening layers of energizing substances as may be desired. In order to maintain the same in position and so that they may be taken apart when required, they are clamped together by means of bolts 5, Fig. 1, connecting a top plate 6 and a bottom plate 7, both of suitable rigid material, such as glass or hard rubber. In charging the battery the electrolyte is poured into the spaces between the plates 1 until the carbon layer 4 is thoroughly saturated with the liquid.

I shall now proceed to describe the improvement which I have devised and applied to a battery of the kind above described, although I remark that I do not wish to be understood as limiting myself to the precise form shown.

In carrying out my invention I provide the upwardly-extending sides $1^a$ of the lead plates 1 with one or more perforations 8 at points preferably slightly above the level of the charcoal layer 3. These perforations I usually make in opposite sides, respectively, of adjacent ones of said plates. In charging the battery a quantity of the electrolyte is poured or flowed into the top or clamping plate 6, the sides of which are perforated, as at $8^a$, Fig. 1. The liquid thereupon flows through the said perforations $8^a$ and 8 (of the upper lead plate 1) into the next lower one of the plates 1, where it circulates through the charcoal layer 3, and the excess overflow through the perforations 8 on the opposite sides of the latter plate, and so on in succession until the overflow of the lowermost one of the plates 1 passes into the bottom or clamping plate 7, which is also provided with raised sides in order to retain the liquid. To recirculate the liquid through the battery, it may be from time to time dipped from the last-mentioned plate and returned to the top plate 6. In order, however, to facilitate the return of or recirculation of the electrolyte, I provide beneath the battery a receptacle 9, Fig. 1, into which the liquid contained in the plate 7 may flow through a pipe 10. A second receptacle 11 is located over the top of the battery, and the contents of the first receptacle are forced through pipes 12 from the latter to the receptacle 11 by a suitable pump 13. A pipe 14 in the bottom of receptacle 11 is provided with a stop-cock 15 for regulating the outflow of the liquid into the top plate 6. As it is desirable to maintain the electrolyte at as nearly an even temperature as possible and it becomes heated as it flows through the pans, I provide means for cooling the electrolyte that is returned to the tank 11. In the present instance I place within the latter a coil of pipe 16, through which cold water is allowed to flow, thereby cooling the liquid. Sometimes, however, it may be desirable to heat the electrolyte, in which case I substitute for the cooling agent a heating agent. I sometimes dispense with the receptacle 9.

In order to sustain the sides of the lead plates 1, I provide along the under side thereof a rigid supporting-frame 17, of hard rubber, glass, or other suitable material, over the top edges of which I bend the margins of the said plates, as seen in the drawings. I also usually hold the sides of the plates and the supporting-frames 17 together by a suitable clamping device—such, for example, as that seen in Fig. 2, which consists of a perforated bushing 18, with a flange 19 on its upper end, and a part 20, that is screwed onto the lower projecting end of the bushing, said part having an opening therethrough at right angles to and communicating with the opening in the bushing. I prefer this construction in lieu of the perforations 8 directly through the plates 1, for the reason that the liquid flowing from the openings is directed toward the lower side of the carbon layer instead of running down along the under side of the plate 1, or rather the frame 17. The bushing-clamp also serves to maintain the plates 1 in close contact with their supporting-frames 17.

Having thus described my invention, I claim as new and desire to secure by Letters Patent—

1. In a storage battery of the character recited, the combination of the series of superposed, pan-shaped lead plates having their flaring sides provided with perforations, the perforations of each plate leading into the space between it and the next succeeding plate, whereby the excess of the electrolyte in one of said plates will overflow into the next plate, and so on, and a separating layer between said plates consisting of an absorbent, non-conducting, acid-resisting material, substantially as and for the purpose set forth.

2. In a storage battery of the character described, the series of superposed pan-shaped lead plates having the flaring sides provided with perforations on opposite sides of successive plates, the perforations of each plate leading into the space between it and the next succeeding plate, substantially as and for the purpose specified.

3. In a storage battery of the character described, the combination of the series of pan-shaped lead plates, having the perforated sides, intervening energizing substances, a separating layer between said plates consisting of an absorbent, non-conducting, acid-resisting substance, and means for effecting the recirculation of the electrolyte, and means for regulating the temperature of the same before it is returned to the battery, substantially as and for the purpose set forth.

In testimony whereof I have hereunto affixed my signature this 5th day of September, A. D. 1900.

ARTHUR D. EDGERTON.

Witnesses:
WALTER C. PUSEY,
JOSHUA PUSEY.